United States Patent [19]

Hoffman et al.

[11] Patent Number: 4,727,827

[45] Date of Patent: Mar. 1, 1988

[54] FUEL ADDITIVE METERING SYSTEM

[75] Inventors: Mark B. Hoffman, Orchard Lake; Paul D. Ryan, Mount Clemens, both of Mich.

[73] Assignee: General Motors Corporation, Detroit, Mich.

[21] Appl. No.: 934,772

[22] Filed: Nov. 25, 1986

[51] Int. Cl.$^4$ ............................................. F02B 75/12
[52] U.S. Cl. .................................. 123/1 A; 123/198 A
[58] Field of Search ........................... 123/1 A, 198 A

[56] References Cited

U.S. PATENT DOCUMENTS

| | | | |
|---|---|---|---|
| 4,161,168 | 7/1979 | Hicks et al. | 123/1 A |
| 4,253,436 | 3/1981 | Dudrey | 123/198 A |
| 4,342,287 | 8/1982 | Concepcion | 123/198 A |
| 4,557,221 | 12/1985 | Kamel et al. | 123/1 A |
| 4,568,248 | 2/1986 | Harders | 123/198 A |
| 4,596,277 | 6/1986 | Djordjevic | 123/1 A |
| 4,621,593 | 4/1986 | Rao et al. | 123/1 A |

OTHER PUBLICATIONS

SAE 840078 Wiedemann et al 1984, p. 15, FIG. 26 and Additive Metering Equipment Text.
SAE 850016 Simon et al 1985, pp. 12-13, FIG. 16 and Additive Dispensing Text.

Primary Examiner—E. Rollins Cross
Attorney, Agent, or Firm—C. K. Veenstra

[57] ABSTRACT

In a diesel engine fuel injection system, a fuel injection pump draws fuel from a reservoir, delivers a portion of the fuel to the engine, and directs excess fuel through a return line back to the reservoir. A supply pump delivers fuel from a tank to the reservoir to maintain a constant volume of fuel in the reservoir. A fuel metering unit measures the rate of fuel delivery by the supply pump. An additive pump feeds an additive through the return line to the reservoir where the additive mixes with the fuel. The fuel metering unit controls the additive pump to proportion the rate at which additive is fed to the reservoir to the rate at which fuel is delivered by the supply pump, and the amount of additive delivered to the engine is thereby proportioned to the amount of fuel consumed by the engine.

5 Claims, 1 Drawing Figure

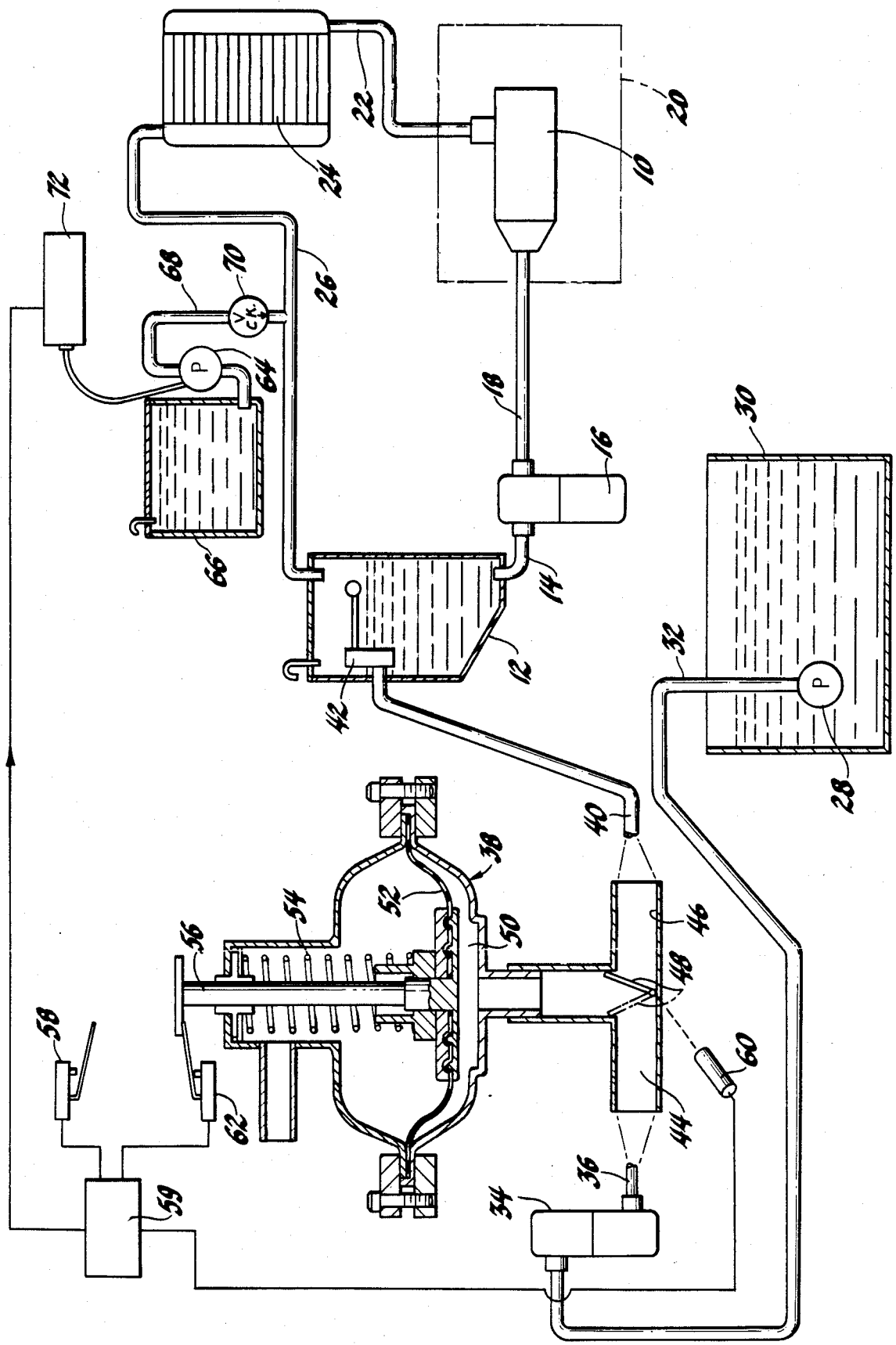

FUEL ADDITIVE METERING SYSTEM

TECHNICAL FIELD

This invention relates to a system in which an additive is mixed with fuel for delivery to an engine.

BACKGROUND

The exhaust system of a diesel engine may be equipped with a trap to separate particulates from the engine exhaust gases and thereby reduce emission of particulates into the atmosphere. Such a trap must be regenerated periodically.

Some proposals for trap regeneration involve use of an additive in the fuel consumed by the engine. When the additive passes to the trap in the engine exhaust gases, it catalyzes combustion of the particulates in the trap and thereby facilitates regeneration of the trap.

SUMMARY OF THE INVENTION

This invention provides a fuel additive metering system by which an additive is mixed with the fuel delivered to an engine in an amount proportional to the amount of fuel consumed by the engine.

In a preferred embodiment of the fuel additive metering system provided by this invention, fuel is drawn from a reservoir, a portion of the fuel is delivered to the engine, excess fuel is directed back to the reservoir, fuel is supplied from a tank to the reservoir to maintain a constant volume of fuel in the reservoir, the amount of fuel supplied from the tank to the reservoir is measured, an additive is fed to the reservoir for mixing with the fuel, and the rate at which additive is fed to the reservoir is proportioned to the rate at which fuel is supplied from the tank to the reservoir, whereby the amount of additive consumed by the engine is proportioned to the amount of fuel consumed by the engine.

The details as well as other features and advantages of a preferred embodiment of this invention are set forth in the remainder of the specification and are shown in the accompanying drawing.

SUMMARY OF THE DRAWING

The sole FIGURE is a schematic view of a preferred embodiment of the fuel additive metering system provided by this invention.

THE PREFERRED EMBODIMENT

Referring to the drawing, a fuel system for a diesel engine includes a fuel injection pump 10 that draws fuel from a reservoir 12 through a line 14, a filter 16 and a line 18, delivers a portion of the fuel to the engine 20, and directs excess fuel through a line 22, a fuel cooler 24 and a return line 26 back to reservoir 12.

A supply pump 28 delivers fuel from a tank 30 through a line 32, a water separator 34, a line 36, a fuel metering unit 38 and a line 40 to reservoir 12. The inlet from line 40 to reservoir 12 is controlled by a float valve 42 to maintain a constant volume of fuel in reservoir 12.

Fuel metering unit 38 has an inlet 44 that receives fuel through line 36 from pump 28, and an outlet 46 that directs fuel through line 40 to reservoir 12. A valve 48 alternately allows fuel to flow into unit 38 through inlet 44, and to flow out of unit through outlet 46. With valve 48 in the position shown by solid lines, pump 28 causes fuel to flow through inlet 44 to a chamber 50 closed by a diaphragm 52. The fuel raises diaphragm 52 against the bias of a spring 54 until a shaft 56 carried by diaphragm 52 closes a switch 58.

When a controller 59 senses closure of switch 58, it energizes a solenoid 60 to move valve 48 from the solid line position to the position shown by dotted lines. The bias of spring 54 then lowers diaphragm 52 and causes fuel to flow from chamber 50 through outlet 46 to reservoir 12 until shaft 56 closes a switch 62. When controller 59 senses closure of switch 62, it deenergizes solenoid 60 to move valve 48 from the dotted line position to the solid line position. Pump 28 then causes additional fuel to flow through inlet 44 to chamber 50

Movement of diaphragm 52 from the position where shaft 56 closes switch 58 to the position where shaft 56 closes switch 62 displaces a calibrated amount of fuel to reservoir 12. The float valve 42 in reservoir 12 admits fuel to the reservoir only as injection pump 10 delivers fuel to engine 20, and the frequency of operation of diaphragm 52 and switches 58 and 62 accordingly indicates the rate at which fuel is delivered to engine 20.

A positive displacement pump 64 feeds additive from a tank 66 through a line 68 and a check valve 70 into return line 26 and thus to reservoir 12 where the additive mixes with the fuel. A controller 72 operates additive pump 64 in response to operation of switch 62, proportioning the rate at which additive is fed to reservoir 12 to the rate at which fuel is delivered by supply pump 28 to reservoir 12, and thereby proportioning the amount of additive delivered to engine 20 to the amount of fuel consumed by the engine.

The fuel additive metering system provided by this invention thereby creates a precisely proportioned blend of additive and fuel for delivery to the engine.

It will be noted that the fuel additive metering system provided by this invention also assures that the additive will not come into contact with fuel that contains water. Any water that may be present in the fuel delivered from tank 30 is separated in separator 34 so the additive may be mixed with water-free fuel in reservoir 12.

It will be further noted that the fuel additive metering system provided by this invention minimizes the time during which the additive must remain mixed with the fuel. By mixing the additive with the fuel in reservoir 12 instead of tank 30, the additive is mixed with fuel in a minimum volume portion of the fuel system, and the residence time of the additive in the fuel is minimized accordingly.

The embodiments of the invention in which an exclusive property or privilege is claimed are defined as follows:

1. A fuel additive metering system for an engine having a fuel injection pump that draws fuel from a fuel supply, delivers a portion of the fuel to the engine, and directs excess fuel back to said supply, said fuel additive metering system comprising a reservoir forming said supply and including means for controlling admission of additional fuel to said reservoir to maintain a constant volume of fuel therein, a fuel metering unit measuring the rate at which such additional fuel is admitted to said reservoir, an additive pump delivering an additive to said reservoir for mixing with the fuel therein, and means for controlling said additive pump to proportion the rate at which additive is fed to the reservoir to the rate at which such additional fuel is admitted to said reservoir, whereby the amount of additive delivered to the engine is proportioned to the amount of fuel consumed by the engine.

2. A fuel additive metering system for an engine having a fuel injection pump that draws fuel from a fuel supply, delivers a portion of the fuel to the engine, and directs excess fuel through a return line back to said supply, said fuel additive metering system comprising a reservoir forming said supply and including means for controlling admission of additional fuel to said reservoir to maintain a constant volume of fuel therein, a fuel metering unit measuring the rate at which such additional fuel is admitted to said reservoir, an additive pump delivering an additive through said return line to said reservoir for mixing with the fuel therein, and means for controlling said additive pump to proportion the rate at which additive is fed to the reservoir to the rate at which such additional fuel is admitted to said reservoir, whereby the amount of additive delivered to the engine is proportioned to the amount of fuel consumed by the engine.

3. A fuel additive metering system for an engine having a fuel injection pump that draws fuel from a fuel supply, delivers a portion of the fuel to the engine, and directs excess fuel through a return line back to said supply, said fuel additive metering system comprising a reservoir forming said supply and including means for controlling admission of additional fuel to said reservoir to maintain a constant volume of fuel therein, and a fuel metering unit having an inlet that receives such additional fuel from a source of fuel under pressure, an outlet that directs such additional fuel to said reservoir, and a valve that alternately allows such additional fuel to flow into said fuel metering unit through said inlet and to flow out of said unit through said outlet, said fuel metering unit also having a chamber closed by a diaphragm and a spring biasing said diaphragm in a direction for discharging fuel from said chamber, said diaphragm being displaced against the bias of said spring by the pressure of said source of fuel when said valve allows fuel to flow through said inlet, said diaphragm carrying a shaft that operates switch means when said diaphragm is fully displaced against the bias of said spring, a solenoid responsive to said operation of said switch means for causing said valve to allow fuel to flow through said outlet and thereby allowing said spring to displace said diaphragm in said fuel discharging direction, said shaft further operating said switch means when said diaphragm is fully displaced in said fuel discharging direction, said solenoid being responsive to said further operation of said switch means for causing said valve to allow fuel to flow through said inlet, and wherein said fuel additive metering system further comprises an additive pump delivering an additive through said return line to said reservoir for mixing with the fuel therein, and means responsive to operation of said switch means for controlling said additive pump to proportion the rate at which additive is fed to the reservoir to the rate at which such additional fuel is admitted to said reservoir, whereby the amount of additive delivered to the engine is proportioned to the amount of fuel consumed by the engine.

4. A method of operating a fuel additive metering system for an engine, said method comprising the steps of drawing fuel from a fuel reservoir, delivering a portion of the fuel to the engine and directing excess fuel back to the reservoir, delivering additional fuel through a water separator to the reservoir, controlling admission of the additional fuel to the reservoir to maintain a constant volume of fuel therein, measuring the rate at which such additional fuel is admitted to the reservoir, delivering an additive to the reservoir for mixing with the fuel therein, and proportioning the rate at which additive is fed to the reservoir to the rate at which such additional fuel is admitted to the reservoir, whereby the amount of additive delivered to the engine is proportioned to the amount of fuel consumed by the engine.

5. A fuel additive metering system for an engine having a fuel injection pump that draws fuel from a fuel supply, delivers a portion of the fuel to the engine, and directs excess fuel back to said supply, said fuel additive metering system comprising a reservoir forming said supply and including means for controlling admission of additional fuel to said reservoir to maintain a constant volume of fuel therein, said engine further having a fuel tank and a supply pump for delivering said additional fuel from said tank to said reservoir, said fuel additive metering system further comprising a fuel metering unit measuring the rate at which such additional fuel is admitted to said reservoir, an additive pump delivering an additive to said reservoir for mixing with the fuel therein, and means for controlling said additive pump to proportion the rate at which additive is fed to the reservoir to the rate at which such additional fuel is admitted to said reservoir, whereby the amount of additive delivered to the engine is proportioned to the amount of fuel consumed by the engine.

* * * * *